United States Patent
Pognant

(10) Patent No.: US 10,908,567 B2
(45) Date of Patent: Feb. 2, 2021

(54) METHOD FOR REGISTERING A CENTRAL CONTROL UNIT BELONGING TO A HOME AUTOMATION INSTALLATION, METHOD OF CONTROL AND CONFIGURATION OF A HOME AUTOMATION INSTALLATION

(71) Applicant: OVERKIZ, Saint-Julien-en-Genevois (FR)

(72) Inventor: Sylvain Pognant, Seynod (FR)

(73) Assignee: OVERKIZ, Saint-Julien-en-Genevois (FR)

( * ) Notice: Subject to any disclaimer, the term of this patent is extended or adjusted under 35 U.S.C. 154(b) by 147 days.

(21) Appl. No.: 15/858,304

(22) Filed: Dec. 29, 2017

(65) Prior Publication Data

US 2018/0224811 A1     Aug. 9, 2018

Related U.S. Application Data

(63) Continuation of application No. PCT/FR2016/051635, filed on Jun. 30, 2016, and a
(Continued)

(30) Foreign Application Priority Data

Jul. 3, 2015  (FR) ..................... 15 56293
Jul. 3, 2015  (FR) ..................... 15 56294

(51) Int. Cl.
*G05B 15/02*     (2006.01)
*H04L 12/28*     (2006.01)

(52) U.S. Cl.
CPC ......... *G05B 15/02* (2013.01); *H04L 12/2809* (2013.01); *H04L 12/2832* (2013.01); *G05B 2219/2642* (2013.01)

(58) Field of Classification Search
CPC ............ G05B 15/02; G05B 2219/2642; H04L 12/2809; H04L 12/2832
See application file for complete search history.

(56) References Cited

U.S. PATENT DOCUMENTS 5,471,190 A * 11/1995 Zimmermann .......... H04B 3/54
340/310.16
6,288,716 B1 * 9/2001 Humpleman ....... H04L 12/2803
348/E5.006
(Continued)

FOREIGN PATENT DOCUMENTS

EP        2631723 A2     8/2013
WO   WO2009080398    *  7/2009 ............. H04L 12/28

OTHER PUBLICATIONS

Bernier, Franck, et al, "Architecture for self-organizing, co-operative and robust Building Automation System," IECON 2013—39th Annual Conference of the IEEE Industrial Electronics Society, IEEE, Nov. 10, 2013 (Nov. 10, 2013), pp. 7708-7713, XP032538653.
(Continued)

*Primary Examiner* — Carlos R Ortiz Rodriguez
(74) *Attorney, Agent, or Firm* — Cantor Colburn LLP

(57) ABSTRACT

The present invention concerns a method for registering a central control unit (U1) belonging to a home automation installation, the method comprising steps (ERSv1) of receiving a first registration request message (MRU1) of a first central control unit (U1), obtaining (ERSv2) a first attachment information of the first central control unit (U1) to a representative entity (St) of a home automation installation, creating (ERSv3) a representative entity (St) of the installation and attaching the first central control unit (U1) to said representative entity (St), receiving (ERSv5) a second registration request message (MRU2) of a second central control unit (U2), obtaining (ERSv6) a second attachment information (StI2) of the second central control unit (U2) to
(Continued)

a representative entity (St), and attachment (ERSv7) of the second central control unit (U2) to a representative entity (St) of the installation to which the first central control unit (U1) is also attached.

8 Claims, 7 Drawing Sheets

Related U.S. Application Data continuation of application No. PCT/FR2016/051636, filed on Jun. 30, 2016.

(56) References Cited

U.S. PATENT DOCUMENTS

| | | | |
|---|---|---|---|
| 9,529,344 B1* | 12/2016 | Hagins | G05B 15/02 |
| 10,243,787 B2* | 3/2019 | Coote | H04L 12/281 |
| 10,401,812 B2 | 9/2019 | Duchene et al. | |
| 2014/0095684 A1* | 4/2014 | Nonaka | H04L 12/2818 |
| | | | 709/223 |
| 2014/0118120 A1* | 5/2014 | Chen | G08C 17/02 |
| | | | 340/12.5 |
| 2014/0159879 A1* | 6/2014 | Rezvani | G06F 21/31 |
| | | | 340/12.22 |
| 2014/0351480 A1* | 11/2014 | Lee | G06F 1/1632 |
| | | | 710/303 |

OTHER PUBLICATIONS

International Search Report for International Application No. PCT/FR2016/051636 dated Oct. 21, 2016 (2 pgs).
Kim, Ji Eun, et al. "Seamless Integration of Heterogeneous Devices and Access Control in Smart Homes," Intelligent Environments (IE), 2012 8th International Conference on, IEEE, Jun. 26, 2012 (Jun. 26, 2012), pp. 206-213, XP032218223.
Pahl, Marc-Oliver, et al., "Knowledge-based middleware for future home networks," Wireless Days (WD), 2009 2nd IFIP, IEEE, Piscataway, NJ, USA, Dec. 15, 2009 (Dec. 15, 2009), pp. 1-6, XP031659489.
International Search Report for Application No. PCT/FR2016/051635.
Written Opinion for International Application No. PCT/FR2016/051635.
Written Opinion for International Application No. PCT/FR2016/051636.

* cited by examiner

METHOD FOR REGISTERING A CENTRAL CONTROL UNIT BELONGING TO A HOME AUTOMATION INSTALLATION, METHOD OF CONTROL AND CONFIGURATION OF A HOME AUTOMATION INSTALLATION

CROSS REFERENCE TO RELATED APPLICATIONS

This application is a continuation of PCT Application No. PCT/FR2016/051635 filed on Jun. 30, 2016, which claims priority to French Patent Application No. 15/56294 filed on Jul. 3, 2015, the contents each of which are incorporated herein by reference thereto.

This application is also a continuation of PCT Application No. PCT/FR2016/051636 filed on Jun. 30, 2016, which claims priority to French Patent Application No. 15/56293 filed on Jul. 3, 2015, the contents each of which are also incorporated herein by reference thereto.

TECHNICAL FIELD

The present invention concerns a registration method of a central control unit belonging to a home automation installation, as well as a configuration method and a control method of a home automation installation.

BACKGROUND

A home automation installation of a building may comprise a plurality of home automation devices. The configuration, the control and/or the supervision of said installation may be performed using a central control unit which communicates with one or more home automation device(s).

In the case of large buildings, it may be necessary either to have recourse to repeaters, or to proceed with the installation of several central control units in order to allow access to the set of home automation devices belonging to the installation. Moreover, in the case of disparate home automation installations, in which many types of home automation devices must be monitored, it may also be desirable to use several central control units which allow communicating in the different communication protocols used by the home automation devices.

If the presence of these different units allows communicating with the set of devices, the architecture accordingly constituted is complex to master for a user.

BRIEF SUMMARY

The present invention aims to solve all or part of the drawbacks mentioned above.

To this end, the present invention concerns a registration method of a central control unit belonging to a home automation installation, the home automation installation comprising a plurality of home automation devices; the method being executed by a management unit connected to the at least one home automation installation and comprising the following steps:

i. Receiving a first registration request message of a first central control unit for the installation transmitted by a first central control unit, or alternatively by a user terminal, in connection with a first identification information IID1.

ii. Obtaining a first attachment information of the first central control unit to a representative entity of a home automation installation.

iii. If the first attachment information corresponds to an absence of attachment of the central control unit to a previously recorded installation, creating a representative entity of the installation and attaching the first central control unit to said representative entity.

iv. Receiving a second registration request message of a second central control unit for the installation, transmitted by the second central control unit, or alternatively by a user terminal, in connection with a second identification information.

v. Obtaining a second attachment information of the second central control unit to a representative entity of a home automation installation.

vi. In the case where the second attachment information corresponds to an attachment to a representative entity of an installation comprising the first central control unit, attaching the second central unit to a representative entity of the installation to which the first central control unit is also attached.

Thanks to the arrangements according to the invention, it is possible to use several central control units within the same installation in order to extend the number of home automation device types or the number of home automation protocols usable in the same installation, or to increase the total number of devices of the installation, while maintaining an identification of the belonging of the different home automation devices to the same installation.

Thus, the interface presented to the user may thus add an abstraction layer to hide the effective attachment of the devices to the central control units. The interface thus represents home automation equipment, such as shutters, blinds, HVAC or lighting systems, which can be driven in the installation as well as the present sensors.

These arrangements are obtained without communication between the central control units, but simply by the logic attachment performed during the registration.

It should be noted that the term home automation device means a home automation equipment and/or a sensor, or else a home automation equipment portion or a sensor portion corresponding to a functional subset.

Moreover, the term message means an information element notified or received in the form of a synchronous or asynchronous call, which may also correspond to a local or remote function call.

The term installation means a set comprising a plurality of home automation devices and a plurality of control units disposed in a single building or on a plurality of locations, each home automation device being connected to an electronic control unit among the plurality of electronic control units, the plurality of electronic control units forming a group under the control of a user. The electronic devices form groups of at least one home automation device attached to an electronic control unit.

The same device or the same control unit may belong to at least two different installations under the responsibility of at least two different users. By way of example, a home automation device corresponding to a heating system may be included in a first home automation installation comprising all devices included in a dwelling, under the control of a user occupying the dwelling, and in a second home automation installation comprising a set of home automation devices corresponding to heating systems disposed in a plurality of dwellings under the control of an administrator user of the heating equipment for the plurality of dwellings.

The term central control unit of the home automation installation, means an electronic unit comprising at least one processing unit for containing and executing at least one computer program, comprising at least one communication module intended to monitor and/or control at least one home automation device and at least one communication module with the management unit. The electronic unit may be independent or integrated into a home automation device. In the latter case, the communication module intended to monitor and/or control the device may be a communication module internal to the home automation device and/or a communication module for monitoring and/or controlling other home automation devices. In some applications, a central control unit may communicate with the management unit through an intermediate management unit, for example a third-party service provider, whose intermediate management unit offers a service interface or API.

During the first step of receiving a first registration request message, the first identification information may be contained in the message or defined in connection with the message, for example by information relating to the consignment network address of the message. The same goes for the second reception step.

According to an implementation mode, the management unit is a server remotely connected to the at least one home automation installation, via a wide area network.

According to another implementation mode, the management unit is a central control unit intended to be connected to one or more central control unit(s) on distinct private or local networks, or else on the same local network.

According to an implementation mode, in the case of the pairing of a new device with a central control unit, or on the contrary of the removal of a device, or else of its modification, an update message is sent to the management unit in order to also update the device group depending on the representative entity.

According to an implementation mode, the representative entity of the home automation installation is associated to a device group grouping the devices contained in at least one first device group attached to the first central control unit and at least one second device group attached to the second central control unit.

Thus, the central control units are considered as attached to the same representative entity of an installation, which brings together all devices of the installation attached either to the first or to the second central control unit in the same group which may be communicated to a user or a third-party application.

According to an embodiment, the representative entity of the home automation installation is associated to a group comprising at least the identifiers of the first central control unit and the second central control unit.

According to an embodiment, the representative entity of the home automation installation is associated to a group comprising at least one identifier of a user.

According to an embodiment, the registration method further comprises the following step:
storing an attachment information of at least one home automation device to a central control unit U.

The storing of this information is provided with a view to routing the messages to the concerned central control unit in the case of control by the management unit.

According to an embodiment, the home automation devices are uniquely identified by a device identifier comprising an identifier of the central control unit to which said device is attached.

According to an embodiment, the first and/or the second attachment information comprise an identifier of a central control unit already belonging to a representative entity, and/or a user identifier and/or an identifier of a representative entity of an installation.

Thanks to these arrangements, it is possible to specify that the first central control unit and the second central control unit are part of the same installation.

Given that the identifier of the central control unit is usually a serial number which is visible and/or accessible to the user and has already been used during the registration process of the central control unit, its use may be preferred to the introduction of a new unique identifier for the installation or the corresponding representative entity. Given that the installation always comprises at least one attached central control unit, it may still be called in this manner. Internally to the server, a unique identifier of the representative entity of the installation may exist to facilitate the implementation.

According to an embodiment, the registration method further comprises, in the case where a central control unit is already paired with one or more device(s) of a group, the following step:
Updating the representative entity to integrate said devices in the device group attached to the representative entity of the installation.

According to an embodiment, the information necessary for the updating of the representative entity may be present in the message, or may be the subject of additional exchanges between the server and said central control unit in order to obtain identification elements of the concerned devices.

The present invention also concerns a control method of a home automation installation, the home automation installation comprising a plurality of home automation devices, and a plurality of central control units; the method being executed by a management unit or by a mobile terminal connected to the at least one home automation installation and comprising the following steps:
i. Receiving a command message coming from a user or a third-party application, or observing the fulfillment of a condition based on a time and/or a date, or else on a value of at least one state variable of a home automation device, the condition or the command message being associated to an execution request of at least one command of a device;
ii. Determining at least one central control unit concerned by the command among the plurality of central control units; and
iii. Sending at least one command message to the at least one central control unit determined in step ii of the home automation installation for the execution of the at least one command.

Thanks to the arrangements of the invention, it is possible to use several central control units within the same installation in order to extend the number of home automation device types or the number of home automation protocols usable in the same installation, or to increase the total number of devices of the installation, while maintaining an identification of the belonging of the different home automation devices to the same installation.

According to an embodiment, the third-party application may be executed as appropriate on the user terminal or on the management unit or on another management unit connected to the user terminal or to the management unit executing the control method.

According to an embodiment, the home automation installation is represented by a representative entity associated to a home automation device group corresponding to the plurality of home automation devices belonging to the installation.

Thanks to these arrangements, the interface presented to the user may thus add an abstraction layer to hide the effective attachment of the devices to the central control units. The interface thus represents the home automation equipment, such as shutters, blinds, HVAC or lighting systems, which can be driven in the installation as well as the present sensors.

These arrangements are obtained without communication between the central control units, but simply by the logic attachment carried out during the configuration.

According to an embodiment, the representative entity is associated to a group of central control units corresponding to the plurality of central control units belonging to the installation.

According to an embodiment, the at least one command corresponds to a script identified by a script identifier, and comprising a plurality of commands;
the script comprises at least one first sub-script comprising at least one command to be performed by a home automation device attached to a first central control unit and one second sub-script comprising at least one command to be performed by a home automation device attached to a second central control unit; and
the first sub-script is pre-recorded in the first central control unit in connection with the script identifier and the second sub-script being pre-recorded in the second central control unit in connection with the script identifier;
in step ii of determining at least one central control unit concerned by the command among the plurality of central control units, the procedure is to establish a list of central control units among the plurality of central control units concerned by the script comprising at least said first central control unit and said second central control unit;
and the step iii of sending at least one command message comprises sending a plurality of execution request messages of at least the pre-recorded sub-scripts in connection with the identifier of the script for the central control units comprised in the list determined in step ii, comprising at least said first central control unit and said second central control unit.

Thanks to these arrangements, it is possible to perform a pre-programming of the scripts, facilitating the automation of the operation of the installation and allowing a simplification of the user interface, thanks to the sub-scripts attached to an overall script identifier which hide the effective attachment of the devices to the central control units.

The term script means a set of commands comprising at least one command intended for at least one home automation device, said set being pre-recorded during a configuration method in at least one central control unit, the script being able to be triggered based on a command of the user, an event triggered by the fulfillment of a condition on the time and/or the date, or else a condition on a state variable of a home automation device which may be in particular a sensor measurement or a state variable of an equipment. A script may be identified by a script identifier.

According to an embodiment, the command message received during the reception step i corresponds to an execution request message of the script identified by the script identifier.

Thanks to the arrangements of the invention, during the execution command of the sub-scripts, it is sufficient to send a command message comprising the identifier of the script to each of the central control units concerned by said script to enable its triggering.

According to an embodiment, the execution of the script is triggered by the observation of the fulfillment of a condition on the time and/or the date, or a condition on a state variable of a home automation device (D);
and/or in which the command message, received during the receiving step i corresponds to a message from a third-party application and comprises an indication of fulfillment of the condition.

According to the arrangements of the invention, the evaluation of the condition may be carried out either by the management unit or the terminal, or by a third-party application which transmits a command message to the management unit or to the terminal.

In particular, the command message may come from a real-time management application being executed on the management unit, if the condition concerns time; or a home automation device via the central control unit to which the device is attached, if the condition concerns a state variable of a home automation device.

According to an embodiment, the method further comprises the following steps:
storing in memory the correspondence between the execution of the script, on the one hand, and executing the at least one first sub-script and the at least one second sub-script, on the other hand; and
determining an execution result of the script depending on the execution results of the at least one first sub-script and the at least one second sub-script.

According to an embodiment, the command message received during the reception step i corresponds to an execution request message of a command group comprising a plurality of commands;
the command group comprises at least one first command sub-group comprising at least one command to be performed by a home automation device attached to a first central control unit and one second sub-group comprising at least one command to be performed by a home automation device attached to a second central control unit;
in the determination step ii of at least one central control unit concerned by the command among the plurality of central control units, the procedure is to establish a list of central control units among the plurality of central control units concerned by the grouped command comprising at least said first central control unit and said second central control unit;
and the sending step iii of at least one command message corresponds to a sending of a plurality of command messages to the central control units included in the list determined in step ii, comprising at least said first central control unit and said second central control unit, each command message corresponding to a triggering instruction of a command sub-group relating to the devices attached to the recipient central control unit.

The term "grouped command" or "command group" means a set of commands comprising a plurality of commands intended for at least two home automation devices, the plurality of commands being intended to be sent to at least one central control unit for an execution upon receipt.

According to an embodiment, the command group is defined for a controlled device group corresponding to a subset of a device group attached to an entity representative of the home automation installation.

According to an embodiment, the method comprises a prior communication step to the user of the device group with a view to performing a selection of the controlled device group.

According to an embodiment, the method comprises the following steps:
  storing in memory the correspondence between the execution of the command group, on the one hand, and executing the at least one first command sub-group and the at least one second command sub-group, on the other hand; and
  determining an execution result of the command group depending on the execution results of the at least one first command sub-group and the at least one second command sub-group.

The present invention also concerns a configuration method of a home automation installation, the home automation installation comprising a plurality of home automation devices and a plurality of central control units; the method being executed by a management unit or by a mobile terminal connected to the at least one home automation installation and comprising the following steps:
  i. Receiving a message comprising a definition by a user or by a third-party application of a script comprising at least one command intended for a plurality of home automation devices, said plurality of home automation devices comprising at least one first home automation device paired with a first central control unit and a second device paired with a second central control unit.
  ii. Assigning a script identifier to said script received in step i;
  iii. Partitioning the script into at least one first sub-script to be performed by said first central control unit and a second sub-script to be performed by said second central control unit, the first sub-script corresponding to a portion of the script to be performed by the first control unit in connection with at least one device attached to said first central control unit, the second sub-script corresponding to a portion of the script to be performed by the second control unit in connection with at least one device attached to said second central control unit.
  iv. Sending the at least one first sub-script and the script identifier to the first central control unit and the at least one second sub-script and the script identifier, to the second central unit control, with a view to register them in said respective central control units in connection with the script identifier.

Thanks to these arrangements, the script is recorded on the central control units in portions with a reference to said script. It is then possible for a user to control the execution of this script either locally by direct access on the central control units, or remotely by the management unit.

According to an embodiment, the script is defined for a controlled device group corresponding to a subset of a device group attached to a representative entity of the home automation installation.

According to an embodiment, the method comprises a prior step of communicating to the user of the device group with a view to performing a selection of the controlled device group in the context of the script.

The present invention also concerns a computer program product comprising code instructions arranged to implement the steps of a method as previously described, when said program is executed by a processor of a management unit or a user terminal.

The present invention also concerns a computer program product comprising code instructions arranged to implement the steps of one or more method(s) as previously described, when said program is executed by a processor of a management unit.

The present invention also concerns a system comprising a management unit arranged to execute one or more method(s) as previously described, connected to at least one central control unit of a home automation installation.

The different aspects defined above which are not incompatible may be combined.

BRIEF DESCRIPTION OF THE DRAWINGS

The invention will be better understood using the detailed description which is shown below compared to the appended drawing in which.

In the following detailed description of the figures defined above, the same elements or the elements fulfilling identical functions might retain the same references so as to simplify the understanding of the invention.

DETAILED DESCRIPTION

Figure 1:
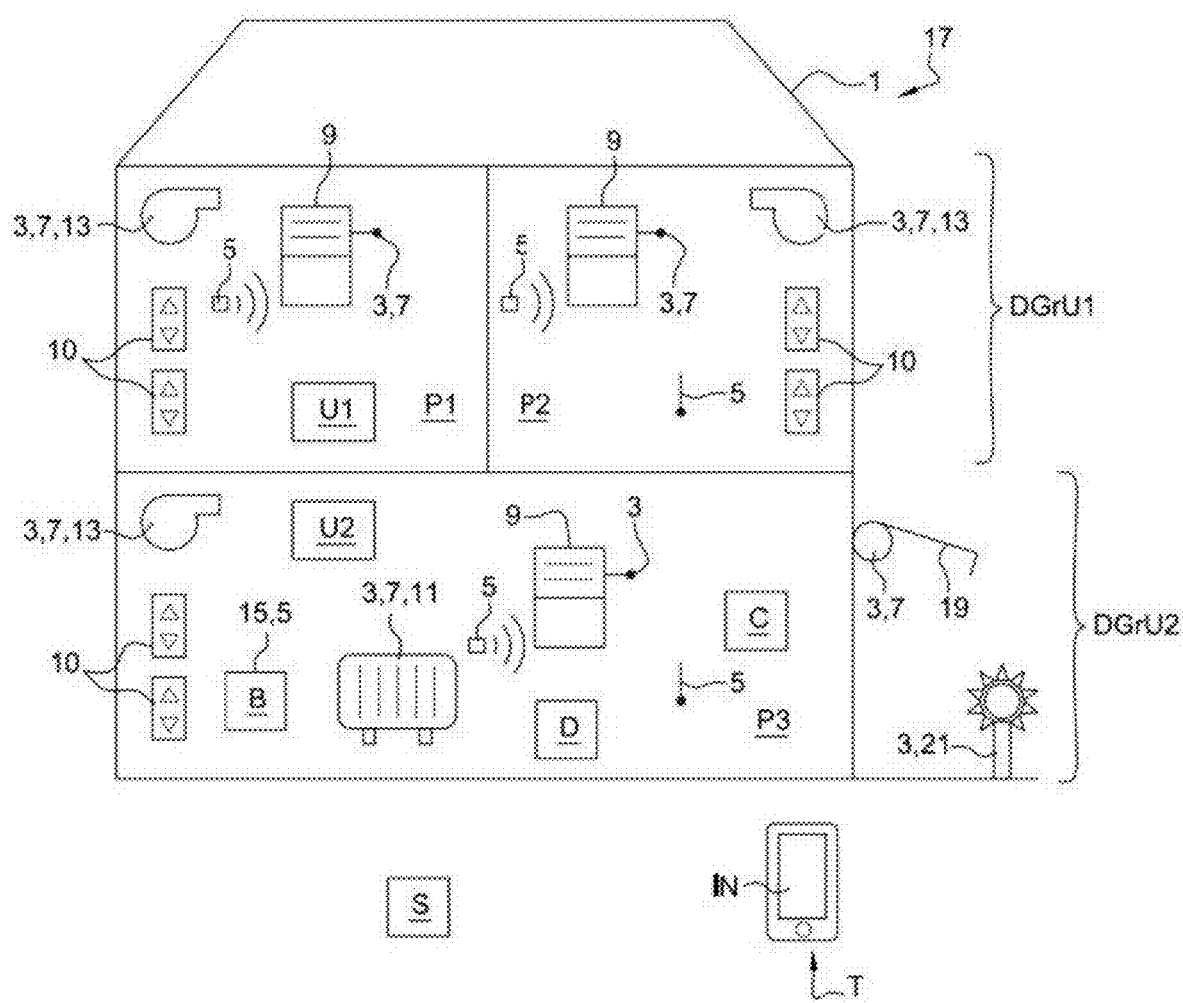
FIG. 1 is a schematic view of a building and a home automation installation in accordance with an embodiment of the invention.

As illustrated in FIG. 1, a building 1 comprises, by way of example, three rooms P1, P2, P3. The building 1 also comprises home automation equipment 3 and sensors 5.

A home automation equipment 3 may be an actuator arranged to displace or adjust a building element 1, for example an actuator 7 to displace a rolling shutter 9 or a terrace blind 19, or a regulation system 10 for a heater 11 or an aeraulic system 13. A home automation equipment 3 may also be a lighting, for example terrace outdoor lighting 21 or a lighting control system, an alarm system, or else a video camera, in particular a video surveillance camera.

The home automation installation 17 may also comprise a control point 15 of an actuator 7, such as a wireless control casing B for the rolling shutter 9.

The home automation installation 17 may comprise one or more sensor(s) 5, in integrated manner with an actuator 7, a control point 15 or else the control casing B, or independently of these elements. A sensor 5 may, in particular, be arranged to measure a physical unit, for example a temperature sensor, a sun lighting sensor or a humidity sensor. Position sensors 5 of home automation equipment 3 of the building 1, such as, for example, sensors of the open state of a rolling shutter 9 or position sensors of a door leaf such as a window, motorized or not, can be also provided. The home automation installation may also comprise one or more presence sensor(s).

A home automation equipment 3 and a sensor 5 are thus to be considered as units having available information on observed actual states of elements of the building 1 and being able to share this information with other elements of the home automation installation 17.

The home automation equipment 3 and the sensors 5 may thus have access to any measurable physical unit, such as the temperature of each room P1, P2, P3 or a state of an element of the building 1, as the opening state of a rolling shutter 9, the status of an alarm, etc.

Subsequently, we will use either the designation of home automation device or device D to designate sensors or home automation equipment, or else portions of home automation equipment 3 or sensors 5.

The home automation installation 17 comprises a plurality of central control units U1, U2. In particular and by way of example, two central control units U1, U2 are shown in FIG. 1.

Each central control unit U1, U2 is arranged for controlling and/or monitoring a portion of the devices D of the installation 17 forming a group DGrU1, DGrU2. By way of example, in FIG. 1, the central control unit U1 is in charge of the devices D disposed in the rooms P1 and P2 of the first floor of the building, while the central control unit U2 is in charge of the devices D disposed in the room P3 on the ground floor of the building and of the external devices.

In particular, the control and/or the monitoring is performed remotely, in particular by using a wireless communication protocol, for example a radio communication protocol. Each central control unit U1, U2 is arranged to group all data from the devices D of the group DGrU1, DGrU2 thereof and to process these data.

The devices D, being part of a group DGrU1, DGrU2, belong to a local area network managed by a central control unit U1 or U2 within the home automation installation and communicate according to a local communication protocol with the central control unit U1 or U2. They have a local address in this network. The logical devices D may be modeled as nodes or end points in the local network.

The local addressing system may be hierarchical or flat, the address format might be numeric or alphanumeric.

Figure 2:
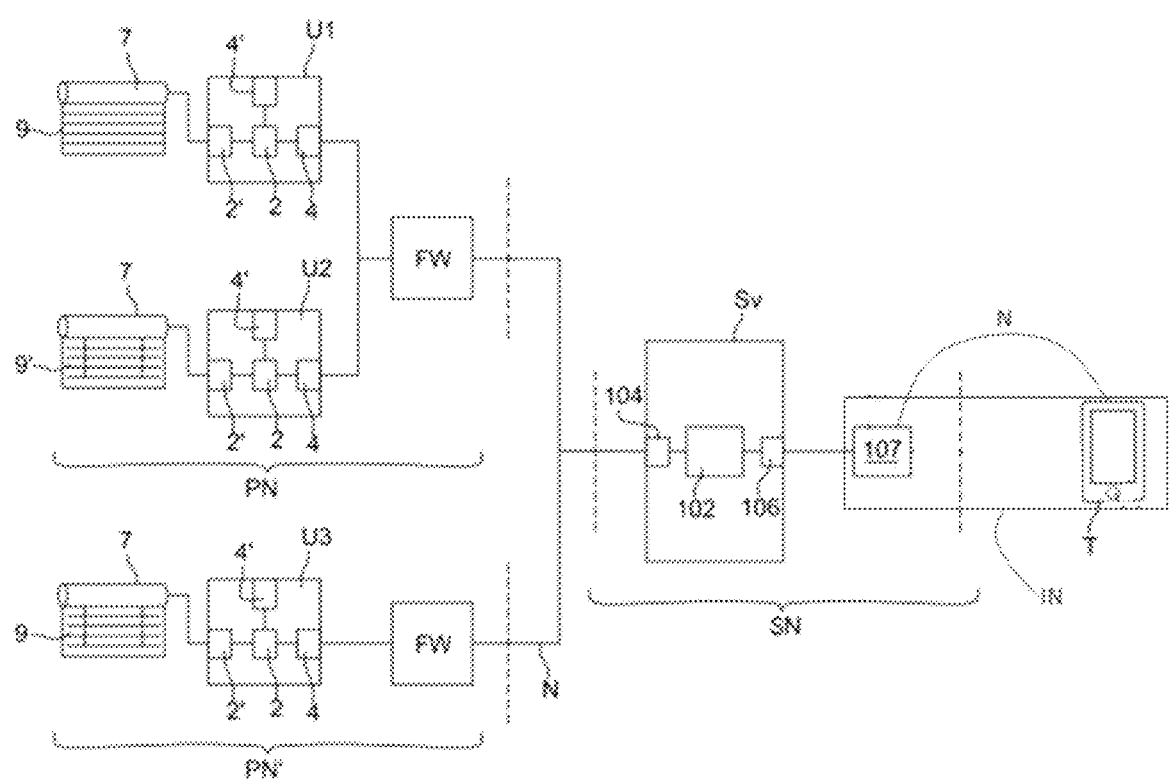
FIG. 2 is a diagram showing an architecture of a system comprising the home automation installation illustrated in FIG. 1 as well as a server intended to be connected to a user terminal.

As shown in FIG. 2, each central control unit U is arranged to communicate with a server Sv.

The central control units U1, U2, U3 are disposed on a private network PN, PN', whose access is generally protected by a firewall FW. In particular, in the example shown in FIG. 2, two central control units U1, U2 are disposed on a first private network corresponding to a first home automation installation, while a third central control unit U3 is disposed on a second private network PN', independent of the private network PN corresponding to a second home automation installation. The server Sv is also disposed on a private network SN. The private network PN is connected to a wide area network N, for example the Internet. Of course, the server Sv is arranged to communicate with a set of such central control units U. We will describe one of these units later.

A central control unit U comprises a processing unit 2 arranged to contain and execute a first computer program. By way of example, the processing unit 2 comprises a processor, a storage flash memory as well as a random access memory, and an Ethernet chip.

The central control unit U further comprises at least one communication module 2' intended for the control and/or the monitoring of home automation equipment 3 and/or sensors 5, the home automation equipment 3 might be actuators 7, lightings 21, an alarm system, or a video camera.

By way of example, as shown in FIG. 2, the communication module 2' allows the monitoring and the control of at least one actuator 7, of a movable element of the building 1, such as for example a roller shutter 9, or an orientable sunshade 9' or other actuators 7 or lightings 21, as previously described with reference to FIG. 1.

For example, the communication module 2' may be arranged to implement for example one or more of the protocols Z-Wave, EnOcean, IO Homecontrol, SOMFY RTS, KNX, MODBUS, WAVENIS, PHILIPS HUE.

According to another possibility, for example in the context of alarm systems, the central control unit may be integrated in the home automation device.

The reception of information from a sensor 5 providing presence information of a user or values of surrounding parameters, such as temperature, humidity and brightness, is also provided. In the same manner, the central unit U may allow the monitoring and/or the control of an alarm system.

Each central control unit U further comprises a communication module 4 with the server Sv. The server Sv allows the remote control and/or monitoring and comprises one or more processing unit(s) 102 arranged to contain and execute a second computer program.

Each central control unit U further comprises a communication module 4' for communicating according to a local communication protocol, for example BLUETOOTH, ZIGBEE or WIFI, with a mobile communication terminal T. The communication terminal T may contain and execute an application software APP.

In some applications, a central control unit U may communicate with the management unit through an intermediate server, for example a third-party service provider, whose intermediate server provides a service interface or API. The server Sv comprises, for its part, at least one communication interface 104 intended for the communication with the central unit U.

The server Sv may also comprise a communication interface 106 intended for the communication with a control and/or monitoring interface IN allowing a user to remotely monitor the home automation installation.

It should be noted that the term server is a logical designation which may cover the use of several physical servers to distribute the computer processing load to be carried out.

The control and/or monitoring interface IN comprises, for example, a web server 107 and a mobile communication terminal T communicating by the wide area network N. The mobile communication terminal T may be, for example, a smartphone or a tablet. The mobile communication terminal T may be the same or a terminal of the same type as that with which the central control unit U locally communicates by means of the communication module 4', or a different terminal. We will designate these mobile terminals by the reference T.

The control and/or monitoring interface IN comprises a processor which may be disposed at the web server 107 and/or the mobile communication terminal T.

The processor of the control and/or monitoring interface IN is arranged to use a third computer program. For its part, this third computer program is arranged to execute a downloadable application.

The mobile communication terminal T comprises a data input device and a display device, for example in the form of a touch control portion of a screen of the terminal T and in the form of one or more button(s) of the terminal T.

FIGS. 1 and 2 describe an installation 17 which comprises a set of devices D and a plurality of central control units U1, U2, disposed in the same housing, the same building or the same physical location.

According to another possibility, an installation 17 within the meaning of the invention may comprise home automation devices disposed on a plurality of locations, with at least one central control unit on each of these places to which the home automation devices are attached, the central control units U of the installation being placed under the control of a user.

By way of example, such an installation may comprise a set of home automation devices constituted by heating systems distributed in a set of dwellings or tertiary premises, attached to a set of central control units U, the set of home automation devices being intended to be controlled by a specific user in charge of the heating for said set of dwellings or tertiary premises.

Figure 3:
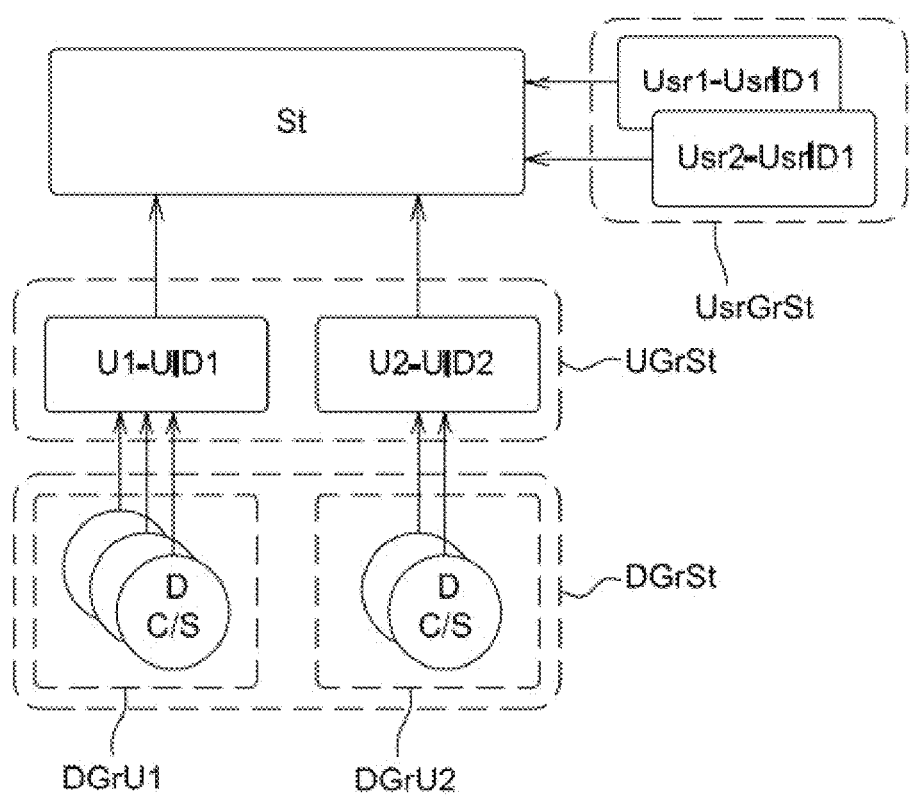
FIG. 3 is a diagram showing the relationships between a representative entity of a home automation installation, the central control units and the devices of the home automation installation.

We will now describe, with reference to FIG. 3, the representation of the installation 17 by a representative entity St on the server Sv, in the case where the installation comprises multiple central control units U.

The system according to the invention attaches several central control units U to a single object St representing an installation 17 by a configuration at the server Sv.

The server Sv may thus present to the user the installation 17 as a single set of devices D to the user, for example via an Application Programming Interface or API, in which each device D may accept a given set of commands C or have state variables S.

The server Sv may also use a system or abstraction layer for the commands C and the state variables S to propose a more generic API and independent of the communication protocol used by a given device D.

The identification of the representative entity St of the installation may be according to an embodiment carried out by any one of the identifiers UID of one of the central control units U present in the installation, by an identifier of the installation or the user Thus, in order to simplify the designation of an installation in the public APIs, it is sufficient that the users of these APIs provide a unique identifier attached to the representative entity St of the installation 17.

Internally to the server, a unique identifier of the representative entity St of the installation 17 may exist to facilitate the implementation.

Thus, the representative entity St may be associated to a list or device group DGrSt grouping the devices contained in the different groups DGrU1, DGrU2 attached to each central control unit U1, U2, and a group UGrSt of the identifiers UID of the concerned central control units U. The devices are identified by a unique identifier.

A representative entity of a home automation installation may be associated with a given user Usr1, identified by an identifier UsrID, corresponding for example to a login and password combination or with a given user group UsrGrSt.

An embodiment example of a unique identifier of a device DURL will now be described.

According to this embodiment, the unique identifier of a device DURL comprises information on:

The local native protocol of the home automation device ID,

The communication path to the device D, including the intermediate central control units U and the ending addresses to be crossed, organized or not in a hierarchical topology; and A subsystem identifier subsystemId if the device includes several functional subsets or subsystems which may be addressed separately. The devices which include only one functional set do not have an identification extension of a subsystem.

Thus, the form of the unique identifier of a device DURL may be as follows:

<protocol>://<gatewayId>/<rawDeviceAddress> (#<subsystemId>)

In which the following fields are present:

protocol: identifier of the native device local protocol;

gatewayId: identifier of the first central control unit U, for example a serial number or a unique identifier.

rawDeviceAddress: a simple path or at several levels. Its meaning and format depend on the addressing scheme of the local communication protocol of the device D.

subsystemId: this optional field indicates an identification, for example a row of the subsystem (starting for example at 1), if such a subsystem is present.

EXAMPLES 1) knx://0201-0001-1234/1.1.3

This unique device identifier DURL corresponds to a device D communicating by the protocol KNX with an individual address 1.1.3 accessible by the central control unit U having the identifier #0201-0001-1234.

2) io://0201-0001-1234/145036 #2 This unique identifier of a device DURL corresponds to a subsystem having the no 2 associated to a device D communicating by the protocol io homecontrol with a radio address 145036 accessible by the central control unit U having the identifier #001-0001-1234.

The manipulation of the data relating to the devices D at the server Sv is performed by an execution process or service ES. In order to store the data relating to the different device instances D mentioned above, the execution service may have access to an instance database IDB. Of course, these different types of instances may also be stored separately. Moreover, the term database means here an appropriate storage mode for a set of instances, which may be stored in a list, a tree or tables or any other appropriate data structure.

Figure 4:
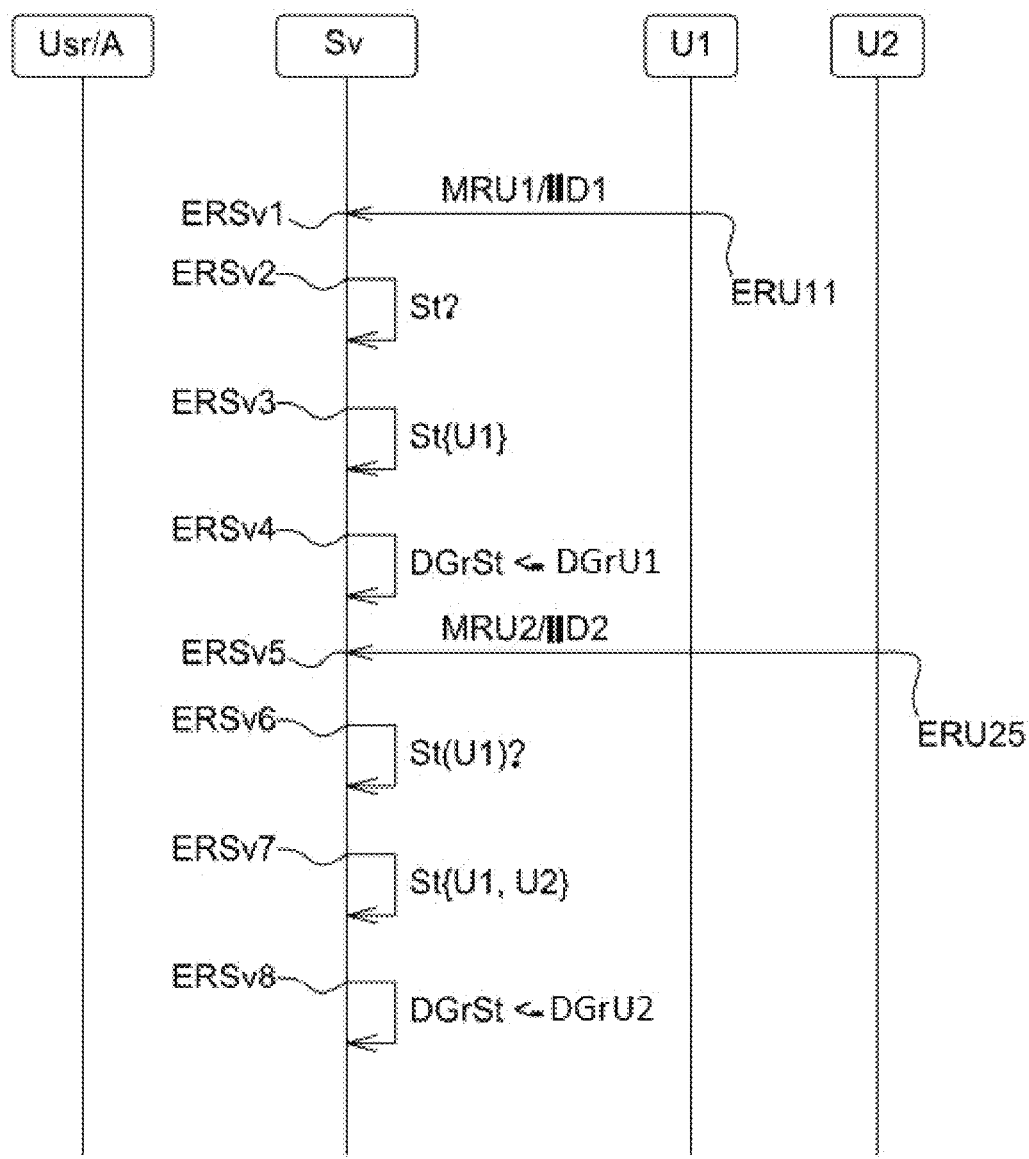
FIG. 4 is a diagram illustrating an embodiment of a registration method of a central control unit of a home automation installation with a management unit according to the invention.

We will now describe a registration method of the central control units U, with reference to FIG. 4, with a server Sv connected to the at least one home automation installation 17.

In a first step ERSv1, the server Sv receives at least one registration request message MRU1 of at least one first central control unit U1 for the installation 17, transmitted in a step ERU1 by a first central control unit U1, and/or by a user terminal T, based on an identification information IID1.

The identification information may correspond, for example, to an identifier of a central control unit already belonging to a representative entity, and/or to an identifier UsrID of the user under responsibility of which the registration is performed, and/or directly to an identifier of a representative entity of an installation. The identification information may be contained in the message or be deduced from the context, for example from a transmission network address of the message, or from features relating to the communication session.

In a second step ERSv2, the server obtains an attachment information StI1 of the first central control unit U1 to a representative entity St of a home automation installation 17. If the attachment information corresponds to an absence of attachment of the central control unit U1 to a previously recorded installation 17, the server proceeds in a third step ERSv3 to the creation of a representative entity of the installation 17 and attaches the first central control unit U1 to this representative entity St. This is in particular the case during the registration of a first central control unit U1 of a given installation.

In the case where a central control unit U is already paired with one or more device(s) D of a group DGrU1, the representative entity St is updated in a fourth step ERSv4 to represent these devices in the device group DGrSt attached to the representative entity of the installation 17. Thus, the device group DGrSt is updated. The information required for the updating of the representative entity St may be present in the message MRU2, or be subject to additional exchanges between the server Sv in order to obtain identification elements of the concerned devices D.

In a fifth step ERSv5, the server Sv receives at least one registration request message MRU2 of a second central control unit U2 for the installation 17, transmitted in a step ERU25 by a second central control unit U2, and/or by a user terminal T, based on an identification information IID2.

As we have seen previously, the identification information may correspond, for example, to an identifier of a central control unit already belonging to a representative entity, and/or to an identifier of the user UsrID under whose responsibility the registration is performed, and/or to an identifier of the installation 17.

In a sixth step ERSv6, the server Sv proceeds to obtain attachment information StI2 of the second central control unit U2 to a representative entity St of a home automation installation 17.

In a seventh step ERSv7, the server Sv proceeds to an attachment of the second central unit to a representative entity St of the installation 17 to which the first central control unit U1 is also attached for the same user UID1.

In the case where the central control unit U2 is already paired with one or more device(s) D of a group DGrU2, the representative entity St is updated in an eighth step ERSv8 to represent these devices in the device group DGrSt linked to the representative entity of the installation 17. Thus, the device group DGrSt is updated. The information required for the updating of the representative entity may be present in the message MRU2, or may be the subject of additional exchanges between the server Sv in order to obtain identification elements of the concerned devices D.

Thus, the central control units U1 and U2 are considered as attached to the same representative entity St of an installation, which brings together all devices D of the installation attached either to the first or to the second central control unit in the same DGrSt group which may be communicated to a user terminal T. These arrangements are obtained without communication between the central control units, but simply by the logical attachment operated during the registration.

The interface presented to the user may thus add an abstraction layer to hide the effective attachment of the devices to the central control units U. The interface thus represents the home automation equipment, such as shutters, blinds, HVAC or lightings, which can be driven in the installation as well as the present sensors.

If the devices D are thus attached to a representative entity of the installation, the attachment information of the home automation devices D to the central control units U are however transmitted to the server Sv, for integration into the data structure, with a view to routing the messages to the concerned central control unit in the case of control by the server Sv. In particular, the identifier of the central control unit to which a product is attached, may be contained in the identifier DURL.

A central control unit U may be detached from the representative entity St of an installation. When a central control unit U is detached, all devices which are managed via the central control unit are removed from the device group DGrSt of the representative entity St of the installation 17. Thus, it is possible to provide that a central unit may not be detached if the representative entity St comprises dependencies on the devices D managed by this central control unit U, as scripts. These dependencies should be removed before that the central control unit U can be detached.

In the case of the pairing of a new device D with a central control unit U, or on the contrary of the removal of a device, or else of its modification, an update message is sent to the Server Sv in order to also update the device list DGrSt depending on the representative entity St.

Thanks to this registration method, the server Sv may therefore propose on the interface IN a description of the installation 17, thanks to the use of the representative entity in the form of a device group D, contained in the device group DGrSt, which have state variables S but also available commands C.

It is thus possible to control and monitor by the interface all the devices of the installation independently of their attachment to the central units U.

Figure 5:
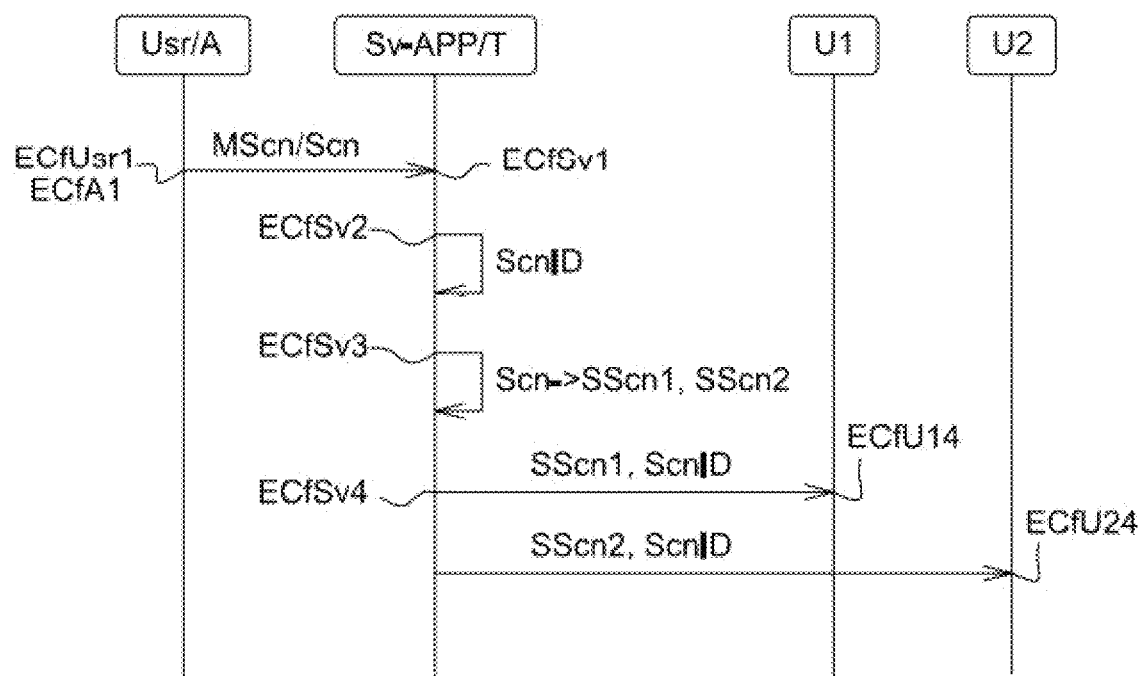
FIG. 5 is a diagram illustrating an embodiment of a configuration method of a home automation installation according to the invention.

We will now describe a configuration method of at least one home automation installation 17 of a building 1 with reference to FIG. 5. We will assume that the configuration method is performed subsequently to the previously described registration method. Thus, the central control units U1 and U2 are attached to the representative entity St, and the devices D are identified in the device group DGrSt attached to the installation.

Thus, it is possible in a first step ECfUsr1 to the user Usr or to a third-party application in a step ECfA1 to define scripts Scn implementing several devices D of the same home installation 17 but attached to distinct central control units U1 or U2. The definition of the script Scn is received and recorded by the server Sv in a step ECfSv1.

We will consider here a script Scn comprising a set of commands C intended for a plurality of home automation devices D, said plurality comprising at least a first home automation device D1 paired with a first central control unit U1 and a second device D2 paired with a second unit control unit U2.

In a second step ECfSv2, the server Sv proceeds to the assignment of a script identifier ScnID to the script defined in the previous step.

In a third step ECfSv3, the server Sv proceeds to a partition of the script Scn into at least two sub-script SScn1 and SScn2 corresponding to script portions to be performed by each of the control units U1 and U2 in connection with the devices D belonging to the device group DGrU1 or DGrU2 attached to the corresponding central unit U1 or U2.

In a fourth step ECfSv4, the server proceeds to the sending of the sub-scripts and the script identifier ScnID to the corresponding central control units U1, U2, the corresponding sub-scripts SScn1, SScn2 being recorded in the central control units in connection with to the same script identifier ScnID.

Thanks to these arrangements, the script is recorded on the central control units SScn1, SScn2 with a reference to said script identifier ScnID. It is then possible for a user to control the execution of this script either locally by a direct access on the central control units, or remotely by the server Sv, as will be detailed below. In both cases, the triggering of the execution of this script Scn may be obtained uniformly for all control units U1, U2, by simply making reference to the (unique) identifier ScnID.

According to a variant of the method, all steps may be carried out by an application APP on a mobile terminal T instead of the server Sv. In this case, the definition step may be made by a graphical interface of the application.

A control method will now be described with reference to FIG. 6, in a case where the command is remotely generated via the user interface IN and the server Sv and in the case of a script command (Scn).

In a first step ECSv1, the server Sv receives a command message MC from a user Usr or an application A relating to an execution request of a script.

We will assume that the command message MC contains an execution request of the script Scn, identified by the script identifier ScnID, configured during the example of the configuration method previously described, which corresponds to the realization of a sub-script SScn1 on the central control unit U1 and the realization of a sub-script SScn2 on the central control unit U2.

In such a case, it is possible that the correspondence between the execution of the sub-scripts Scn1 and Scn2 and of the script Scn is kept in memory for an appropriate error management. In particular, the execution service ES may implement a state automaton to this end.

Thus, in a step ECSv2, the server proceeds to the establishment of a list of central control units U among the plurality of central control units concerned by the script Scn comprising at least said first central control unit U1 and said second central control unit U2.

Moreover, the server Sv establishes in a step ECSv2' the correspondence between the execution result of the Script Scn and the respective execution results of the two sub-scripts SScn1 and SScn2, this correspondence can be stored in memory or in the database.

In a third step ECSv3 a first command message MSScn1 is sent to the central unit U1 of the home automation installation 17 for the execution of the sub-script SScn1. As previously explained, the sub-scripts SScn1, SScn2 may be recorded in the central units U1, U2, in connection with the same script identifier ScnID. In this case, the message MSScn1 contains a simple reference to the identifier ScnID.

In the shown example, we assume that the return of this first command corresponds to a success of the realization of the sub-script with a return code RSSc1, sent by the central control unit U1 in a step ECU13. The execution service may store this success value.

In a step ECSv4, a second command message MSSCn2 is sent to the central control unit U2 of the home automation installation 17 for the execution of the sub-script SScn2. The message MSScn2 contains in this case a simple reference to the identifier ScnID. In the shown example, we assume that the return of the execution of the second sub-script corresponds to a failure, with return of a return code RSScn2, sent by the central control unit U2 in a step ECU24.

In a last step ECSv5, the execution service defines a response RScn to be returned to the user following the command message MC.

Given that a sub-script or return code result has been received for each executed sub-script, the results must be aggregated to simulate an overall result for the script Scn. In particular, the script Scn is considered as performed if all sub-scripts SScn1, SScn2 have been successfully performed, and failed if one or more sub-script(s) have failed.

Figure 6:
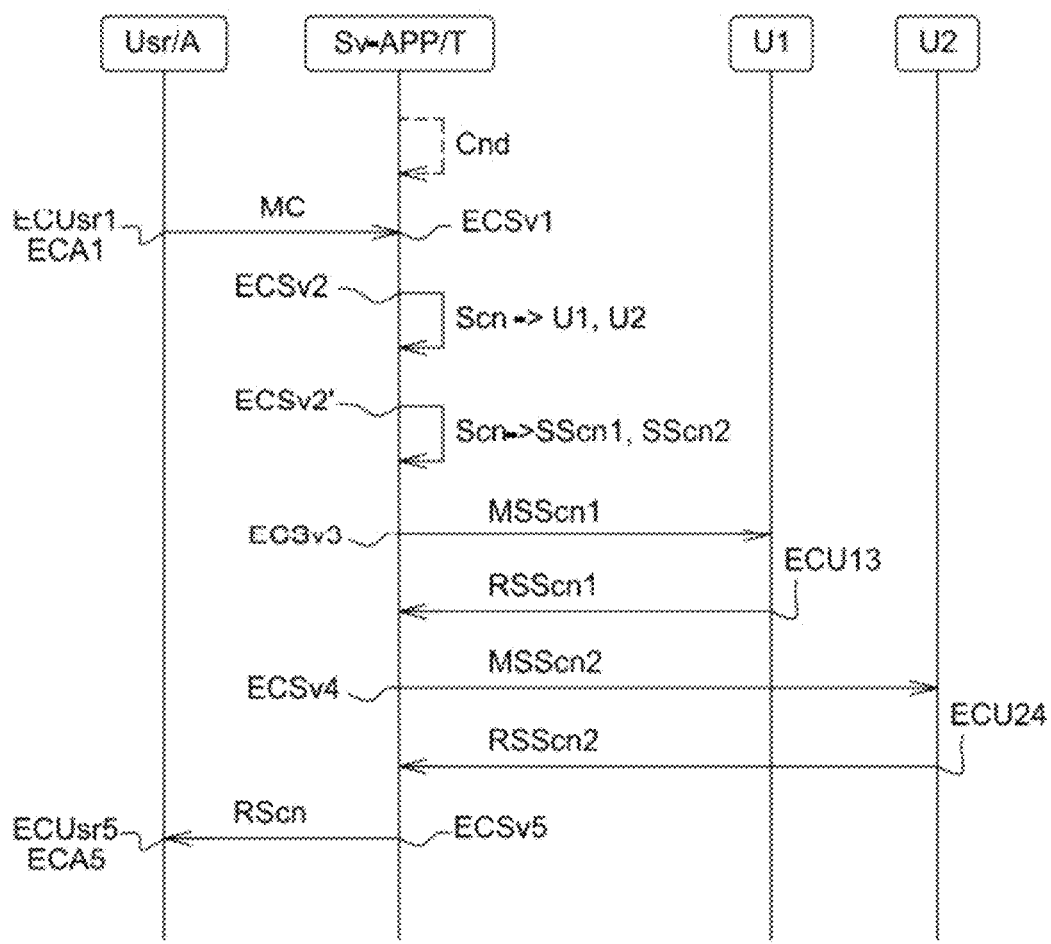
FIG. 6 is a diagram illustrating an embodiment of a control method of a home automation installation according to the invention.

In the case illustrated in FIG. 6, it is possible to consider that the script Scn has failed.

This response is communicated to the user Usr or the application A which receives it in a step ECUsr5 or ECA5.

According to a variant of the method, all steps may be carried out by an application APP on a mobile terminal T instead of the server Sv. In this case, the reception step may be performed by the communication of an order by the user via the graphical interface of the application.

According to a variant of the method, the control method may be triggered during step ECSv1 by the observation of the fulfillment of a condition Cnd based on the time and/or at least one state variable of a device, the evaluation of the condition may be performed either by the management unit or the terminal. This step alternative to the reception of a message is shown in FIG. 6 in dotted lines.

In the case where the evaluation of the condition is performed by a third-party application which transmits a command message to the management unit or the terminal, the receiving step is present as previously described. In particular, the command message may come from a real-time management application being executed on the management unit, if the condition concerns the time; or a home automation device via the central control unit to which the device is attached, if the condition concerns a state variable of a home automation device.

Another embodiment of the control method will now be described with reference to FIG. 7, in a case where the command is remotely generated via the user interface IN and the server Sv and in the case of a command group CGr.

In a first step ECSv1, the server Sv receives a command message MC coming from a user Usr or an application A relating to an execution request of a command group CGr comprising a plurality of commands C.

We will assume that the command group CGr comprises at least a first sub-group of commands CSGR1 comprising at least one command C to be performed by a home automation device D attached to a first central control unit U1 and a second command sub-group CSGr2 comprising at least one command C to be performed by a home automation device D attached to a second central control unit U2.

In such a case, it is possible that the correspondence between the execution of the command sub-groups CSGr1 and CSGr2 and the command group CGr is retained in memory for an appropriate error management. In particular, the execution service ES may implement a state automaton to this end.

Thus, in a step ECSv2, the server proceeds to the establishment of a list of central control units U among the plurality of central control units U concerned by the command group CGr comprising at least said first central control unit U1 and said second central control unit U2.

Moreover, the server Sv establishes in a step ECSv2' the correspondence between the execution result of the command group CGr and the respective execution results of the two command sub-groups CSGr1 and CSGr2, this correspondence being able to be stored in memory or in the database.

In a third step ECSv3 a first command message MCSGr1 is sent to the central unit U1 of the home automation installation 17 for the execution of the command sub-group CSGr1. This first command message MCSGr1 comprises instructions for triggering the commands of the command sub-group CSGr1 relating to the devices D attached to the central control unit U1.

In the shown example, we assume that the return of this first command sub-group MCSGr1 corresponds to a success of the realization of the sub-group with a return code RSCGr1, sent by the central control unit U1 in a step ECU13. The execution service may store this success value.

In a step ECSv4, a second command message MCSGr2 is sent to the central control unit U2 of the home automation installation 17 with a view to executing the sub-group CSGr2. This second command message MCSGr2 comprises instructions for triggering the commands of the command sub-group CSGr2 relating to the devices D attached to the central control unit U2. In the shown example, we assume that the return of the execution of the second command sub-group CSGr2 corresponds to a failure, with return of a return code RCSGr2, sent by the central control unit U2 in a step ECU24.

In a final step ECSv5, the execution service defines a response to be returned to the user following the command message MCGr.

Given that a sub-group or return code result has been received for each executed sub-group, the results should be aggregated to simulate an overall result for the group Scn. In particular, the command group CGr is considered as performed if all sub-groups CSGr1, CSGr2 have been successfully performed, and failed if one or more sub-groups have failed.

Figure 7:
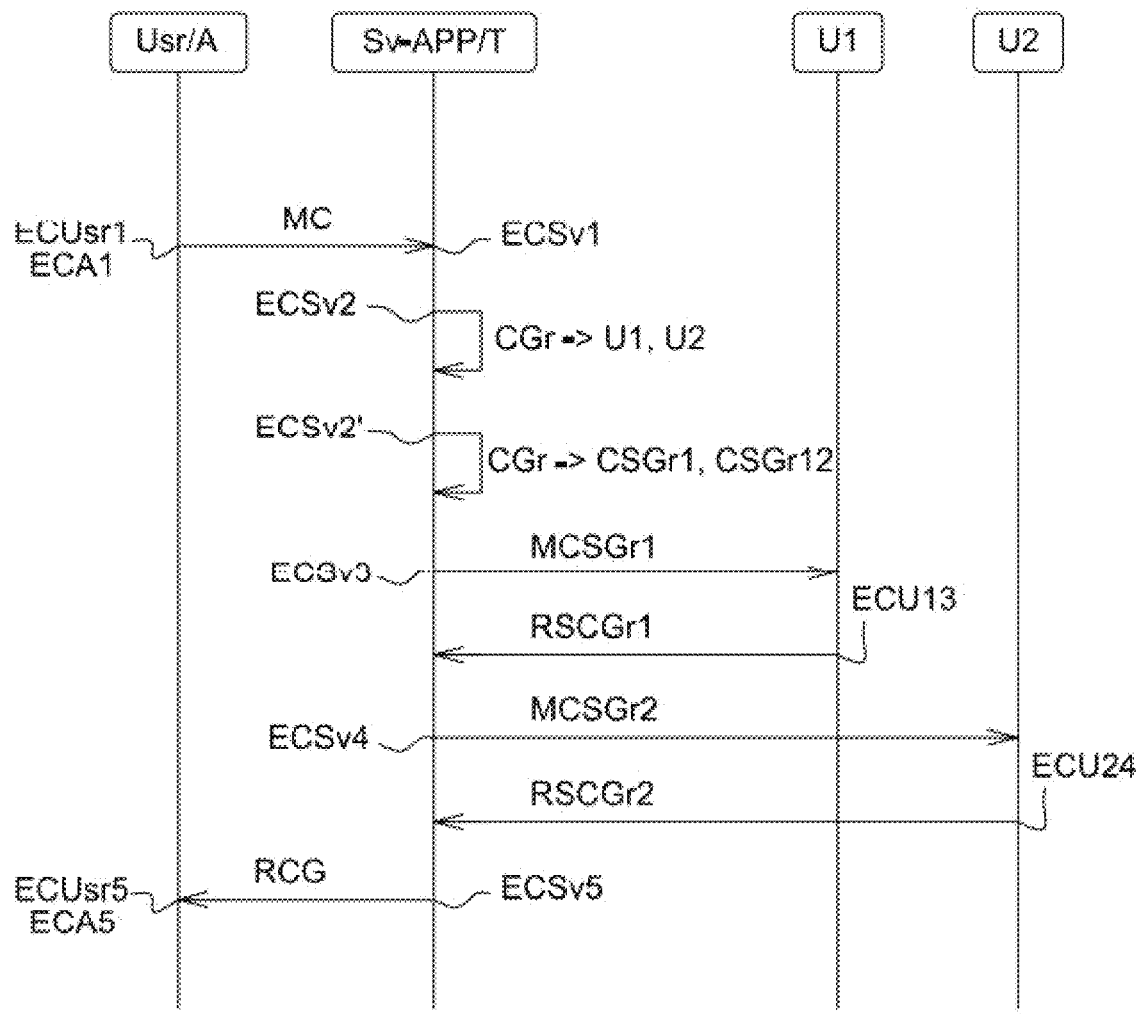
FIG. 7 is a diagram illustrating another embodiment of a control method of a home automation installation according to the invention.

In the case illustrated in FIG. 7, it may be considered that the command group CGr has failed.

This response is communicated to the user Usr or the application A which receives it in a step ECUsr5 or ECA5.

According to a variant of the method, all the steps may be performed by an application APP on a mobile terminal T instead of the server Sv. In this case, the reception step may be performed by the communication of an order by the user via the graphical interface of the application.

According to another embodiment of the non-shown method, a simple command C of a home automation device D may be processed by the server Sv or by the mobile terminal T, upon receipt of a command message from a user Usr or a third-party application A.

In this case, a determination of at least one central control unit U concerned by the command C among the plurality of central control units U1, U2 of the installation 17 is performed, this central control unit U corresponding to the central unit to which the device D to be controlled is attached.

Subsequently, the procedure is to send at least one command message to the central control unit U previously determined with a view to executing the at least one command C on the device D.

The invention claimed is:

1. A registration method of a central control unit belonging to a home automation installation, the home automation installation comprising a plurality of home automation devices; the method being executed by a management unit connected to the home automation installation and comprising the following steps:
   i. receiving a first registration request message of a first central control unit for the home automation installation transmitted by the first central control unit, or alternatively by a user terminal, in connection with a first identification information;
   ii. obtaining a first attachment information of the first central control unit to a representative entity of the home automation installation;
   iii. if the first attachment information corresponds to an absence of attachment of the first central control unit to a previously recorded home automation installation, creating the representative entity of the home automation installation and attaching the first central control unit to the representative entity of the home automation installation;
   iv. receiving a second registration request message of a second central control unit for the home automation installation, issued by the second central control unit, or alternatively by the user terminal, in connection with a second identification information;
   v. obtaining a second attachment information of the second central control unit to the representative entity of a home automation installation; and
   vi. in the case where the second attachment information corresponds to an attachment to a representative entity of an installation comprising the first central control unit, attaching the second central control unit to the representative entity of the home automation installation to which the first central control unit is also attached, wherein the representative entity of the home automation installation is associated to a group of devices grouping the home automation devices contained in at least one first device group attached to the first central control unit and at least one second device group attached to the second central control unit.

2. The registration method according to claim 1, wherein the representative entity of the home automation installation is associated to a group comprising identification information of the first central control unit and the second central control unit.

3. The registration method according to claim 1, wherein the representative entity of the home automation installation is associated to a group comprising at least one identifier of a user.

4. The registration method according to claim 1, further comprising the following step:
   storing an attachment information of at least one of the plurality of home automation devices to a central control unit.

5. The registration method according to claim 1, wherein the plurality of home automation devices are uniquely identified by a device identifier comprising an identifier of the central control unit to which the plurality of home automation devices are attached.

6. The registration method according to claim 1, wherein the first and/or the second attachment information comprise an identifier of a central control unit already belonging to the representative entity, and/or a user identifier and/or an identifier of the representative entity of the home automation installation.

7. The registration method according to claim 1, further comprising, in the case where a central control unit is already paired with one or more of the plurality of the home automation device(s) to at least one first device group, the following step:
   updating the representative entity of the home automation installation to integrate the one or more of the plurality of home automation devices in the group of devices attached to the representative entity of the home automation installation.

8. A computer program product comprising a non-transitory computer readable storage medium comprising code instructions to implement the steps of a method according to claim 1, the non-transitory computer readable storage medium being readable by a processor of a management unit and storing instructions for the processor of the management unit for implementing the steps of the method according to claim 1.

\* \* \* \* \*